(12) United States Patent
Davis et al.

(10) Patent No.: US 12,151,817 B2
(45) Date of Patent: Nov. 26, 2024

(54) SEAT ASSEMBLIES AND METHODS FOR CHANGING A PASSENGER SITTING ANGLE ACCORDING TO AIRCRAFT FLIGHT MODE

(71) Applicant: B/E Aerospace, Inc., Winston-Salem, NC (US)

(72) Inventors: Lyle T. Davis, Pfafftown, NC (US); Michael R. Warwick, Pleasant Garden, NC (US); Nicholas Coppola, Charlotte, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 121 days.

(21) Appl. No.: 17/714,474

(22) Filed: Apr. 6, 2022

(65) Prior Publication Data
US 2023/0322389 A1    Oct. 12, 2023

(51) Int. Cl.
*B64D 11/06* (2006.01)

(52) U.S. Cl.
CPC ........ *B64D 11/064* (2014.12); *B64D 11/0601* (2014.12)

(58) Field of Classification Search
CPC .......... B60N 2/32; B60N 2/34; B60N 2/2875; B60N 2/2878; B60N 2002/0288; B64D 11/06; B64D 11/0601; B64D 11/0604; B64D 11/0606; B64D 11/0641; B64D 11/0643; B64D 11/064
See application file for complete search history.

(56) References Cited

U.S. PATENT DOCUMENTS

| | | | |
|---|---|---|---|
| 6,669,141 B2 * | 12/2003 | Schmidt-Schaeffer | ...................... B60N 2/01 244/118.6 |
| RE39,101 E | 5/2006 | Miyahara et al. | |
| 8,596,720 B2 | 12/2013 | Ootsuka et al. | |
| 9,365,142 B1 * | 6/2016 | Line | ......................... B60N 2/62 |
| 9,457,751 B1 * | 10/2016 | Stancato | ............ B60N 2/42763 |
| 10,000,288 B2 | 6/2018 | Udriste et al. | |

(Continued)

FOREIGN PATENT DOCUMENTS

| | | | |
|---|---|---|---|
| EP | 1630031 A2 * | 3/2006 | ........... B60N 2/0284 |
| EP | 1707486 A1 | 10/2006 | |

(Continued)

OTHER PUBLICATIONS

14 CFR 121.311; Federal Aviation Administration; 1964-2023; <https://www.ecfr.gov/current/title-14/part-121/section-121.311>. (Year: 2023).*

(Continued)

*Primary Examiner* — Christopher D Hutchens
*Assistant Examiner* — Michael A. Fabula
(74) *Attorney, Agent, or Firm* — Suiter Swantz IP

(57) ABSTRACT

A method for changing passenger seating angle according to an aircraft flight mode utilizing a raked passenger seat configuration in which the seat angle relative to an aircraft longitudinal axis increases as the passenger seat transitions from an upright condition to a reclined condition. Such a passenger seat may be utilized in an aircraft passenger seating arrangement to maximize seating density while complying with defined taxi, takeoff and landing (TTOL) certification criteria for oblique seats, among other applications and benefits.

6 Claims, 4 Drawing Sheets

(56) References Cited

U.S. PATENT DOCUMENTS

| | | | |
|---|---|---|---|
| 10,773,607 B2 | 9/2020 | Akaike et al. | |
| 2004/0195882 A1* | 10/2004 | White | B60N 2/643 |
| | | | 297/284.3 |
| 2007/0040434 A1* | 2/2007 | Plant | B64D 11/0641 |
| | | | 297/354.13 |
| 2008/0088160 A1 | 4/2008 | Johnson | |
| 2015/0266448 A1* | 9/2015 | Aoki | B60N 2/688 |
| | | | 297/354.1 |
| 2016/0288752 A1* | 10/2016 | Stancato | B60R 21/01546 |
| 2016/0332734 A1 | 11/2016 | Goode | |
| 2017/0043681 A1* | 2/2017 | Seiller | B60N 2/002 |
| 2017/0368968 A1* | 12/2017 | Shibata | B60N 2/914 |
| 2017/0368969 A1* | 12/2017 | Shibata | B60N 2/914 |
| 2018/0022246 A1* | 1/2018 | Patrick | B60N 2/02246 |
| | | | 297/284.3 |
| 2018/0072199 A1* | 3/2018 | Strumolo | B60N 2/99 |
| 2018/0134181 A1* | 5/2018 | Ketels | B60N 2/22 |
| 2018/0170230 A1* | 6/2018 | Onuma | F04B 43/00 |
| 2018/0208080 A1* | 7/2018 | Hirayama | B60N 2/914 |
| 2019/0092475 A1* | 3/2019 | Carlioz | B64D 11/00153 |
| 2019/0308525 A1* | 10/2019 | Riedel | B60N 2/02 |
| 2021/0107661 A1 | 4/2021 | Aung et al. | |
| 2021/0221520 A1 | 7/2021 | Oleson | |

FOREIGN PATENT DOCUMENTS

| | | | | |
|---|---|---|---|---|
| EP | 2957459 A1 * | 12/2015 | | B60N 2/22 |
| EP | 4212434 A1 | 7/2023 | | |
| GB | 2530556 A | 3/2016 | | |
| GB | 2586273 A | 2/2021 | | |
| JP | 4422755 B2 | 2/2010 | | |
| WO | WO-02102203 A1 * | 12/2002 | | A47C 4/02 |
| WO | 2020089442 A1 | 5/2020 | | |

OTHER PUBLICATIONS

Extended European Search Report dated Aug. 8, 2023; European Application No. 23166803.9.

* cited by examiner

SEAT ASSEMBLIES AND METHODS FOR CHANGING A PASSENGER SITTING ANGLE ACCORDING TO AIRCRAFT FLIGHT MODE

TECHNICAL FIELD AND BACKGROUND

The present disclosure relates generally to aircraft passenger seating, and more particularly, to passenger seat assemblies and methods for changing a seat angle relative to an aircraft longitudinal axis according to an aircraft flight mode.

Aircraft passenger seats must meet different regulatory certification criteria based, at least in part, on the taxi, takeoff and landing (TTOL) installation angle relative to the aircraft longitudinal axis. Certification criteria exist for forward facing passenger seats defined as having a seat longitudinal axis from 0-18° relative to the aircraft longitudinal axis, oblique passenger seats defined as having a longitudinal axis from 18-45° relative to the aircraft longitudinal axis, and side-facing passenger seats defined as having a seat longitudinal axis from 80-100° relative to the aircraft longitudinal axis.

To maximize passenger seat density, privacy, etc., it may be desirable in some cabin configurations to install seats at an angle that mandates unusual or even undefined criteria, for instance a seat angle greater than 45° and less than 80° relative to the aircraft longitudinal axis. In that case, the passenger seat would require certification criteria different from the certification criteria of the nearest defined range. For example, a passenger seat having a TTOL installation angle of 49° would be subject to different regulatory certification criteria as compared to a passenger seat having a TTOL installation angle of 45°. To enjoy the benefits and advantages of the nearest angular range in terms of known criteria, weight, cost, safety, etc., it would be desirable to design a seat configured with adjustability to change the passenger angle during flight versus TTOL, or vice versa. Such adjustability would meet TTOL compliance while providing increased density and comfort advantages during flight.

While solutions are known for adjusting passenger seat angles relative to the longitudinal aircraft axis, conventional solutions utilize devices configured to swivel the entire seat including the supporting frame. Such devices tend to be complex, costly and add unwanted weight, and importantly require clearance around the seat to allow for rotational movement.

Therefore, what is desired is a solution that provides a subtle and refined change in the seat angle without having to manipulate the entire seat.

SUMMARY OF THE INVENTIVE ASPECTS

To achieve the foregoing and other advantages, the inventive aspects disclosed herein are broadly directed to assemblies and methods for changing seat angle, and consequently passenger angle, according to different aircraft flight modes. For example, a passenger seat according to the present disclosure may be installed in an aircraft at an angle relative to an aircraft longitudinal axis, and a seat angle of the passenger seat may change as the passenger seat adjusts from an upright configuration to a reclined configuration, and vice versa, such that the passenger seat complies with predefined certification criteria at least when the passenger seat is in the upright configuration for TTOL.

According to a first aspect, embodiments of the inventive concepts are directed to a method for effecting a seat angle change according to an aircraft flight mode. The method includes providing a passenger seat adjustable between an upright configuration and a reclined configuration, wherein adjusting the passenger seat between the upright configuration and the reclined configuration induces a change in seat angle, and consequently passenger angle, relative to an aircraft longitudinal axis. The method continues with positioning the passenger seat in an aircraft at an angle to the aircraft longitudinal axis, for instance a TTOL installation angle according to defined certification criteria. During flight, the method continues with adjusting the passenger seat from the upright configuration to the reclined configuration to change, e.g., increase, the seat angle relative to the aircraft longitudinal axis. In preparation for taxi, takeoff or landing (TTOL), the method continues with adjusting the passenger seat from the reclined configuration to the upright configuration to change, e.g., decrease, the seat angle relative to the aircraft longitudinal axis.

In some embodiments, the seat angle, when the passenger seat is in the upright configuration, corresponds to a TTOL installation angle of the passenger seat.

In some embodiments, the seat angle, when the passenger seat is in the upright configuration, is no greater than 45° relative to the aircraft longitudinal axis, and wherein the seat angle, when the passenger seat is in the reclined configuration, is greater than 45° relative to the aircraft longitudinal axis, and preferably about 49° relative to the aircraft longitudinal axis.

In some embodiments, the passenger seat comprises a seat back, a seat bottom and a leg rest, and when the passenger seat adjusts from the upright configuration to the reclined configuration, an angle formed between the seat back and the seat bottom increases, an angle formed between the leg rest and the seat bottom increases, and the leg rest extends along a leg rest extension angle different from a TTOL installation angle of the passenger seat.

In some embodiments, the seat bottom is raked, the seat back is positioned at a first end of the seat bottom, and the leg rest is positioned at a second end of the seat bottom opposite the first end.

In some embodiments, as the passenger seat adjusts from the upright configuration to the reclined configuration, the seat bottom distorts from a rectangular shape to a skewed parallelogram shape.

In some embodiments, the leg rest extension angle is greater than 45° relative to the aircraft longitudinal axis.

In some embodiments, as the passenger seat adjusts from the upright configuration to the reclined configuration, a seat back angle relative to the TTOL installation angle remains constant.

In some embodiments, when the passenger seat is in the reclined configuration, the seat back, the seat bottom and the leg rest align in a single, substantially horizontal plane.

According to a second aspect, embodiments of the inventive concepts are directed to an aircraft passenger seating arrangement including a longitudinal aisle parallel to an aircraft longitudinal axis, spaced walls positioned to one side of the longitudinal aisle, and a passenger seat positioned between the spaced walls. The passenger seat is adjustable between an upright configuration and a reclined configuration and adjusting the passenger seat between the upright configuration and the reclined configuration induces a change in seat angle relative to the aircraft longitudinal axis. The passenger seat is positioned at an angle to the aircraft longitudinal axis, for instance at a TTOL installation angle. Adjusting the passenger seat from the upright configuration to the reclined configuration changes, e.g., increases, the seat angle relative to the aircraft longitudinal axis. Adjusting the passenger seat from the reclined configuration to the upright configuration changes, e.g., decreases, the seat angle relative to the aircraft longitudinal axis.

In some embodiments, the seat angle, when the passenger seat is in the upright configuration, corresponds to a TTOL installation angle of the passenger seat and the TTOL installation angle is no greater than 45° relative to the aircraft longitudinal axis, and wherein the passenger seat angle, when the passenger seat is in the fully reclined configuration, e.g., forming a bed, the seat angle is greater than 45° relative to the aircraft longitudinal axis.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1:
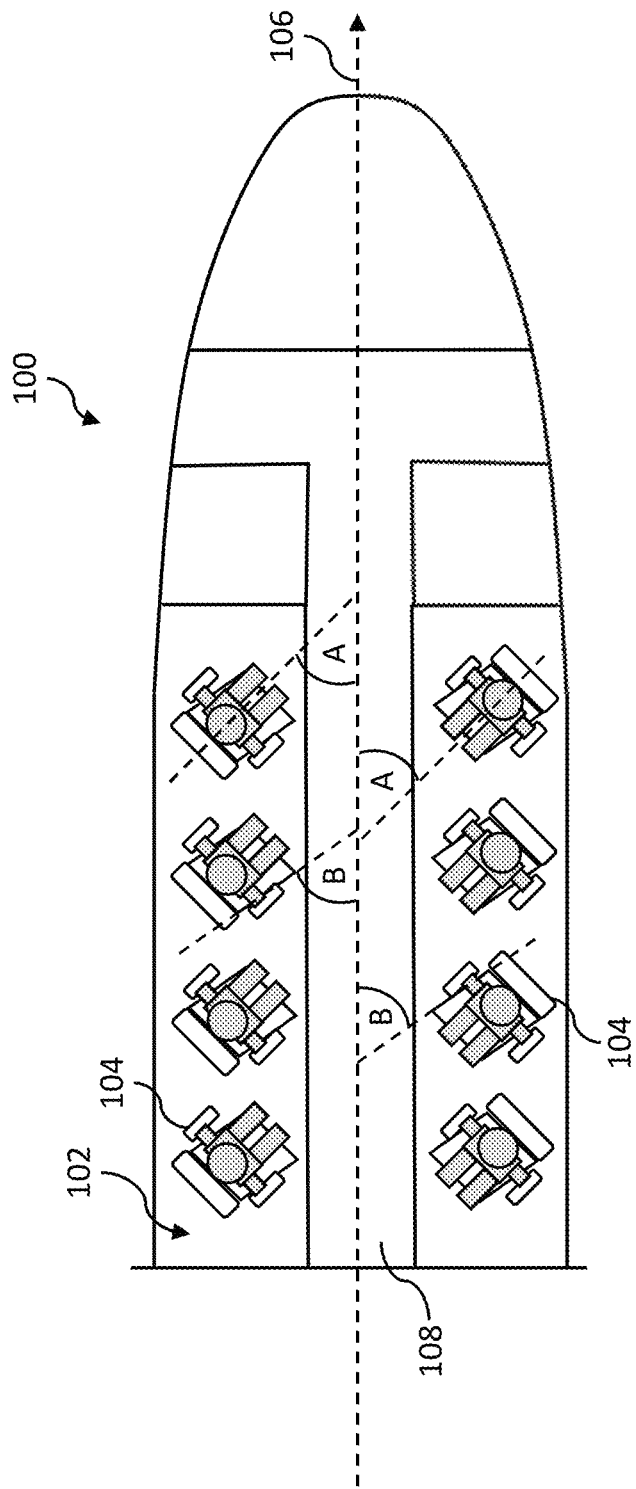
FIG. 1 is a schematic diagram of an aircraft passenger seating arrangement, according to an embodiment of the present disclosure, including passenger seats configured to adjust in seat angle according to the flight mode of the aircraft.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to passenger seat assemblies for inducing a seat angle change as the passenger seat transitions from upright to reclined and vice versa, methods for changing seat angle and passenger seat angle according to an aircraft flight mode, and implementations of aircraft passenger seating arrangements.

Referring to FIG. 1, a passenger aircraft 100 includes a passenger cabin 102 in which a plurality of passenger seats 104 are positioned. The aircraft 100 defines an aircraft longitudinal axis 106 corresponding to the direction of flight. In most passenger aircraft, at least one longitudinal aisle 108 is arranged parallel to the aircraft longitudinal axis 106. In narrowbody aircraft, a central aisle (as shown) typically divides the cabin into spaced left and right columns. In widebody aircraft, two longitudinal aisles may separate the cabin into left, right and center columns. According to the present disclosure, at least one of the passenger seats 104 in the passenger cabin 102 is positioned at an angle relative to the aircraft longitudinal axis 106, and in some embodiments the seats are all angled and form columns of seats. The at least one passenger seat 104 is adjustable to change the seat angle consequently changing the passenger angle relative to the aircraft longitudinal axis 106 according to an aircraft flight condition or flight mode. As shown, and discussed further below, angle "A" corresponds to a TTOL aircraft condition in which a TTOL certification criteria applies, and angle "B" corresponds to at least one flight condition in which the TTOL certification criteria does not apply, wherein angle "B" is greater than angle "A".

As discussed above, seat installation angles from 0-18° are classified as forward facing, seat angles from 18-45° are classified as oblique facing, and seat angles from 80-100° are classified as side facing. Each classification is subject to different regulatory criteria. The same applies to aft facing seats +180° of the angular ranges. Presently, no regulatory certification criteria exist for seat angles greater than 45° and less than 80°. As such, the present disclosure provides seat assemblies in which the seat angle can be changed temporarily during flight, or temporarily changed for TTOL, such that the seat meets certification criteria for its TTOL configuration.

For example, a passenger seat according to the present disclosure, when in an upright configuration for TTOL, may have a TTOL installation in compliance with a predefined classification, for example an angular range from 18-45° relative to the aircraft longitudinal axis 106, and a reclined configuration during flight in which the seat angle and passenger angle do not comply with the predefined classification, for example an angular range greater than 45° and less than 55°, more preferably about 49° relative to the aircraft longitudinal axis 106. In this example, the passenger seat would meet the certification criteria for the TTOL position when upright while providing the ability to reposition the seated passenger during flight where no certification criteria apply. In other words, the passenger seat adjusts in seat angle, thereby changing the passenger angle, between TTOL and during flight of the aircraft if desired by the passenger, such that the seat TTOL angle meets the regulatory certification criteria for an oblique facing seat. In other applications, the passenger seat according to the present disclosure can be utilized to change the passenger angle for reasons other than meeting certification criteria.

Figure 2:
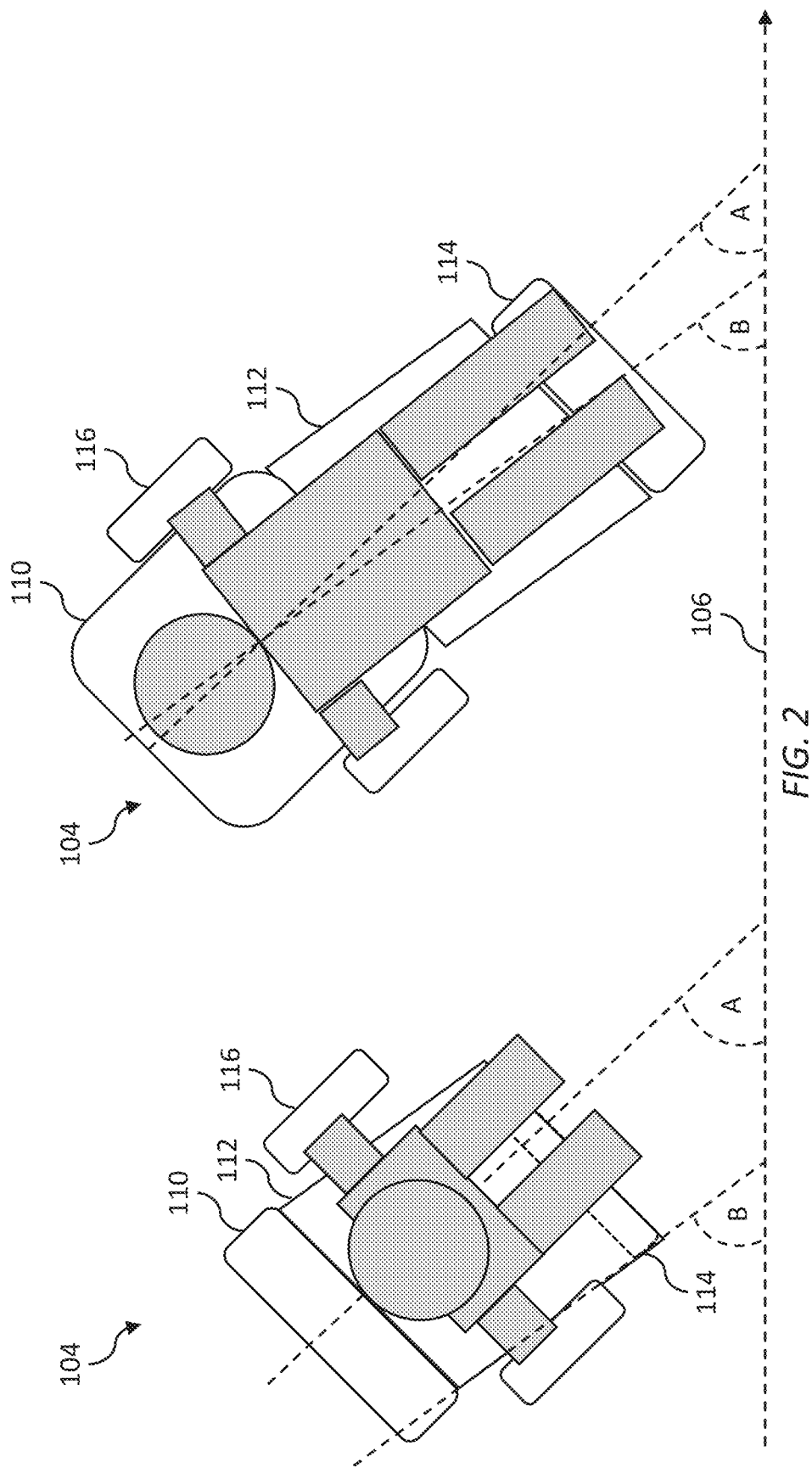
FIG. 2 is a schematic diagram of an aircraft passenger seat, according to an embodiment of the present disclosure, adjustable between upright and reclined configurations to change the seat angle.

Referring to FIG. 2, a passenger seat 104 according to the present disclosure is shown in its upright (left) and reclined (right) configurations. While fully upright and reclined configurations are shown, it is intended and envisioned that the passenger seat adjustment may be held in any of the fully upright, fully reclined, and intermediate positions. Seat elements may adjust individually or in combination. As used herein, "reclined" means any seat configuration other than upright for TTOL, for instance a bed configuration in which the seat elements are generally positioned in a horizontal plane.

The passenger seat 104 generally includes a seat back 110, a seat bottom 112, and a leg rest 114, and optionally includes at least one armrest 116. In the fully upright configuration of the passenger seat 104 shown on the left, the seat back 110 and the leg rest 114 are nearest vertical, with the leg rest 114 positioned against the front of the seat to facilitate egress. In the fully reclined configuration shown on the right, the seat back 110 and the leg rest 114 are at or near horizontal. Adjusting or transitioning the passenger seat 104 from the upright configuration to the reclined configuration involves rotating each of the seat back 110 and the leg rest 114 about a horizontal axis. In some embodiments, movement of the seat back 110 and the leg rest 114 may further include translation relative to the seat bottom 112.

As shown, the seat bottom 112 is raked, i.e., distorted from a rectangular shape to a skewed parallelogram. In some embodiments, the seat bottom 112 is a fixed raked shape. In alternative embodiments, the seat bottom 112 adjusts from substantially rectangular to raked as the passenger seat transitions from upright to reclined. The seat back 110 is positioned proximate one end of the seat bottom 112 and the leg rest 114 is positioned an opposite end of the seat bottom 112 such that the seat increases in length as the passenger seat adjusts to reclined, for instance to form a bed. Regarding the passenger seat construction, support elements may be attached to frame elements coupled for relative movement to achieve the seat configurations discussed herein.

As evident comparing the upright and reclined configurations, the seat angle "B" of the passenger seat 104, corresponding to the reclined configuration, is greater than the seat angle "A" of the passenger seat corresponding to the upright configuration. In a non-limiting example, the seat angle "A" may be no greater than 45° and the seat angle "B" may be greater than 45°, for instance about 49°. In a non-limiting example, the seat bottom sides may be 41° relative to the aircraft longitudinal axis 106 such that a TTOL installation angle of 45° relative to the aircraft longitudinal axis produces a seat angle of 49° relative to the aircraft longitudinal axis in the fully reclined configuration. The change in seat angle consequently changes the passenger angle as evident comparing the upright and reclined configurations. In addition, evident comparing the two configurations, neither the seat back 110 nor the leg rest 114 rotate about a vertical axis as they move between configurations.

Factors that influence the passenger angle relative to the aircraft longitudinal axis 106 include the seat back angle (measured in the z-axis), the lateral side angles of the seat bottom 112, backrest cushion, and the amount of offset of the leg rest 114 about the longitudinal seat axis. Other factors that may introduced to influence the passenger angle relative to the seat itself include an offset/asymmetric location of seat belt attachment points as well as visual cues (i.e., items positioned directly forward of the seated passenger intended to capture the passenger's focus and attention causing the passenger to face an intended direction).

Figure 3:
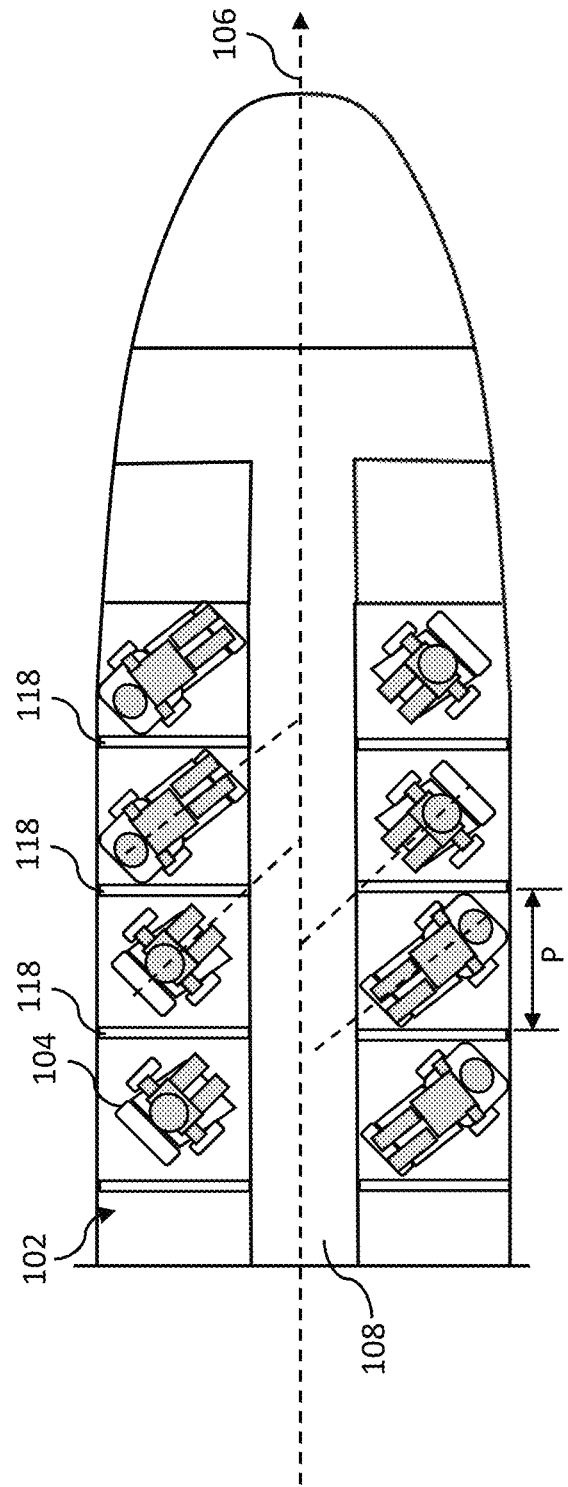
FIG. 3 is a schematic diagram of a passenger seat, according to an embodiment of the present disclosure, installed between spaced walls in an aircraft cabin.

Referring to FIG. 3, a non-limiting example of an aircraft passenger seating arrangement for a narrow body aircraft is shown. The passenger cabin 102 includes a center aisle 108 parallel to the aircraft longitudinal axis 106. Passenger seats 104 are arranged to form spaced columns positioned along opposite sides of the center aisle 108. While one column as shown includes exclusively forward-facing passenger seats and the other column includes exclusively rear-facing passenger seats, it is understood and envisioned that any or all passenger seats in the cabin may be configured as forward-facing or rear-facing.

Each passenger seat 104 is angled relative to the aircraft longitudinal axis 106. For example, each passenger seat installation angle, which corresponds to the TTOL angle, is no greater than 45° to be classified as oblique facing. Each passenger seat 104 is positioned between spaced walls 118 which may take the form of privacy dividers, partitions, monuments, curtains, etc. In a particular embodiment, the pitch "P" between adjacent walls 118 is such that the seat length, when fully adjusted or 'extended' would contact at least one of the spaced walls if the seat were not racked. Therefore, raking the passenger seat allows lesser pitch between the spaced walls to accommodate the horizontally adjusted bed length.

Factors that influence the seated passenger angle relative to the seat frame 206 and the aircraft longitudinal axis include the back angle (measured in the z-axis) in relation to the lateral sides of the backrest cushion, and the angle of the leading or forward edge of the seat bottom cushion in relation to the lateral sides of the seat bottom cushion. As discussed below, other factors that influence the seat angle of a passenger relative to the seat itself include the offset/asymmetric location of the seat belt attachment points as well as visual cues (i.e., items positioned directly forward of the seated passenger intended to capture the passenger's focus and attention, such as a video monitor, causing the passenger to face an intended direction).

Figure 4:
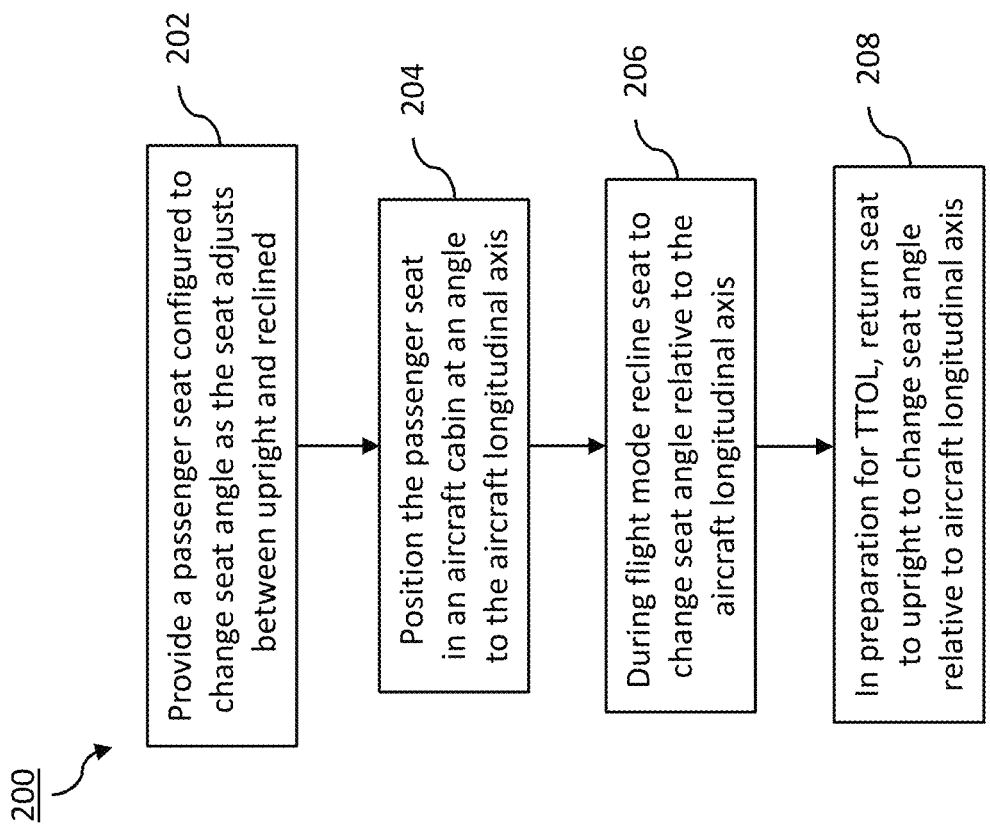
FIG. 4 is a flow diagram of a method for effecting a change in seating angle/passenger angle according to different aircraft flight modes.

Referring to FIG. 4, a method 200 according to the present disclosure is operative to effect a seat angle change according to the aircraft flight mode, wherein aircraft flight modes include, but are not limited to, flight, TTOL and preparation for TTOL. In a first Step 202, the method includes providing a passenger seat according to the above, wherein the passenger seat is adjustable between an upright configuration and a reclined configuration, and wherein adjusting the passenger seat between the upright configuration and the reclined configuration induces a change in seat angle, and consequently passenger angle, relative to an aircraft longitudinal axis. In a Step 204, the method continues with positioning the passenger seat according to the above in an aircraft passenger cabin at an angle to the aircraft longitudinal axis, for instance a TTOL installation angle according to defined certification criteria. During flight, in a Step 206, the method continues with adjusting the passenger seat from the upright configuration to the reclined configuration to change, e.g., increase, the seat angle relative to the aircraft longitudinal axis. In preparation for taxi, takeoff or landing (TTOL), in a Step 208 the method continues with adjusting the passenger seat from the reclined configuration to the upright configuration to change, e.g., decrease, the seat angle relative to the aircraft longitudinal axis.

In embodiments, a controller, located within or remote from the seat, may be operative to actuate seat adjustment selectively by the passenger or cabin crew, or automatically in advance of or during a flight mode. In some embodiments, passenger control is locked and the passenger seat is incapable of being adjusted from upright during or in preparation for TTOL.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A method for effecting a passenger sitting angle change according to an aircraft flight mode, comprising the steps of:
    providing a passenger seat including a seat back and a seat bottom, wherein the passenger seat is adjustable between an upright configuration and a reclined configuration, wherein adjusting the passenger seat between the upright configuration and the reclined configuration induces a change in passenger sitting angle relative to an aircraft longitudinal axis;
    positioning the passenger seat in an aircraft at a fixed seat installation angle that is angled relative to the aircraft longitudinal axis, wherein the passenger seat is not rotatable about a vertical axis;
    during a flight condition of the aircraft, adjusting the passenger seat from the upright configuration to the reclined configuration to increase the passenger sitting angle relative to the aircraft longitudinal axis; and
    in preparation for a taxi, takeoff or landing (TTOL) condition of the aircraft, adjusting the passenger seat from the reclined configuration to the upright configuration to decrease the passenger sitting angle relative to the aircraft longitudinal axis;
    wherein:
    the passenger sitting angle, when the passenger seat is in the upright configuration, is no greater than 45° relative to the aircraft longitudinal axis;
    the passenger sitting angle, when the passenger seat is in the reclined configuration, is greater than 45° relative to the aircraft longitudinal axis; and
    the seat bottom is shaped as a parallelogram and a forward end of the seat bottom is laterally shifted relative to the seat back.

2. The method according to claim 1, wherein, when the passenger seat is in the upright configuration, the passenger sitting angle corresponds to a TTOL compliant condition of the passenger.

3. The method according to claim 1, wherein the passenger seat further includes a deployable leg rest.

4. An aircraft passenger seating arrangement, comprising:
    a longitudinal aisle oriented parallel to an aircraft longitudinal axis;
    spaced walls positioned to one side of the longitudinal aisle; and
    a passenger seat positioned between the spaced walls;
    wherein:
    the passenger seat includes a seat back and a seat bottom, wherein the passenger seat is adjustable between an upright configuration and a reclined configuration;
    adjusting the passenger seat between the upright configuration and the reclined configuration induces a change in passenger sitting angle relative to the aircraft longitudinal axis;
    the passenger seat is installed adjacent to and positioned facing the longitudinal aisle, wherein the passenger seat is installed at a fixed seat installation angle, and wherein the passenger seat is not rotatable about a vertical axis;
    adjusting the passenger seat from the upright configuration to the reclined configuration increases the passenger sitting angle relative to the aircraft longitudinal axis; and
    adjusting the passenger seat from the reclined configuration to the upright configuration decreases the passenger sitting angle relative to the aircraft longitudinal axis;
    wherein:
    the passenger sitting angle, when the passenger seat is in the upright configuration, is no greater than 45° relative to the aircraft longitudinal axis;
    the passenger sitting angle, when the passenger seat is in the reclined configuration, is greater than 45° relative to the aircraft longitudinal axis; and
    the seat bottom is shaped as a parallelogram and a forward end of the seat bottom is laterally shifted relative to the seat back.

5. The aircraft passenger seating arrangement according to claim 4, wherein, when the passenger seat is in the upright configuration, the passenger sitting angle corresponds to a TTOL compliant condition of the passenger.

6. The aircraft passenger seating arrangement according to claim 4, wherein the passenger seat further includes a deployable leg rest.

* * * * *